S. R. BERGMAN.
DYNAMO ELECTRIC MACHINE.
APPLICATION FILED AUG. 3, 1916. RENEWED DEC. 15, 1919.

1,340,005.

Patented May 11, 1920.

Inventor:
Sven R. Bergman,
by
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,340,005.  Specification of Letters Patent.  Patented May 11, 1920.

Application filed August 3, 1916, Serial No. 112,940. Renewed December 15, 1919. Serial No. 344,976.

*To all whom it may concern:*

Be it known that I, SVEN R. BERGMAN, a subject of the King of Sweden, residing at Nahant, county of Essex, State of Massachusetts, have invented certain new and useful Improvements in Dynamo-Electric Machines, of which the following is a specification.

In accordance with my invention, I arrange an $n$-pole armature winding in a field structure comprising $2n$ mechanical poles, arranged in two sets with an equal number of poles in each set, with adjacent poles in the separate sets arranged to be of like polarity. At least three brushes are arranged to bear upon the commutator, this being the smallest number possible with a two pole armature. I am thus enabled to derive from the armature three electromotive forces, one of which is the resultant of the other two, which electromotive forces may be used to supply any desired circuits. Two of the brushes are spaced substantially 180 electrical degrees apart and arranged with respect to said poles so that the voltage between said brushes is dependent on the flux in both sets of poles. One set of poles is arranged to produce a voltage between the third brush and one 180 degree brush and the other set is arranged to produce a voltage between the third brush and the other of the 180 degree brushes. By constructing a machine in this way, and properly controlling the flux in each set of poles, the machine may be designed with any desired operating characteristics. By arranging the sets of poles so that the voltage between the 180 degree brushes is equal to the difference between the voltages induced by the separate sets of poles and arranging the sets of poles to produce voltages varying at different rates with variations in the speed of the armature, I am enabled by the inherent action of the machine to maintain a load circuit connected to these brushes at substantially constant voltage over a wide range of speed and load.

Figure 2:
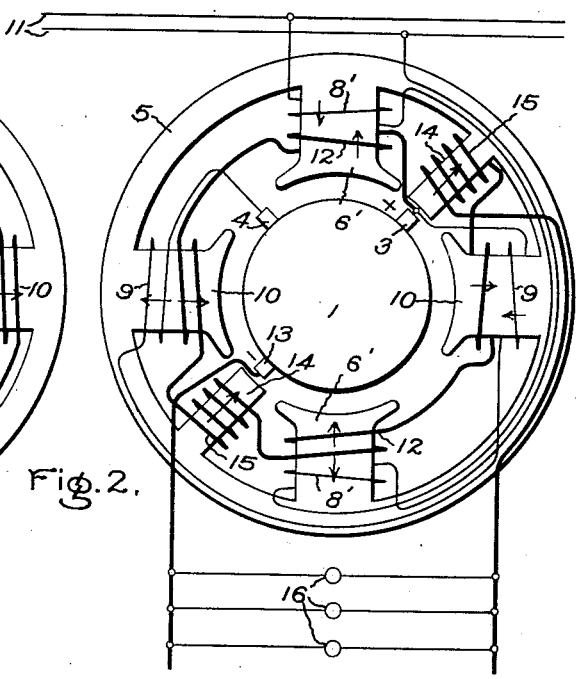
Figure 3:
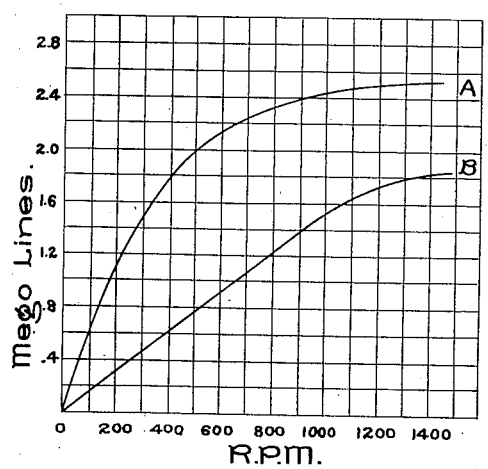
Figure 4:
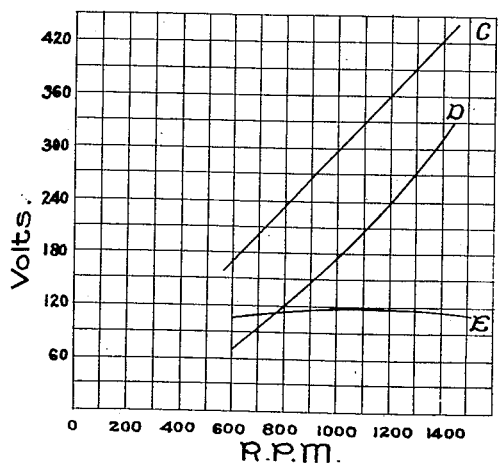

Other features of novelty which characterize my invention are pointed out with particularity in the claims annexed to and forming a part of this specification. For a better understanding of my invention reference may be had to the following description, taken in connection with the accompanying drawing, in which Figure 1 shows diagrammatically one embodiment of my invention, Fig. 2 shows a modification, and Figs. 3 and 4 are explanatory diagrams.

Figure 1:
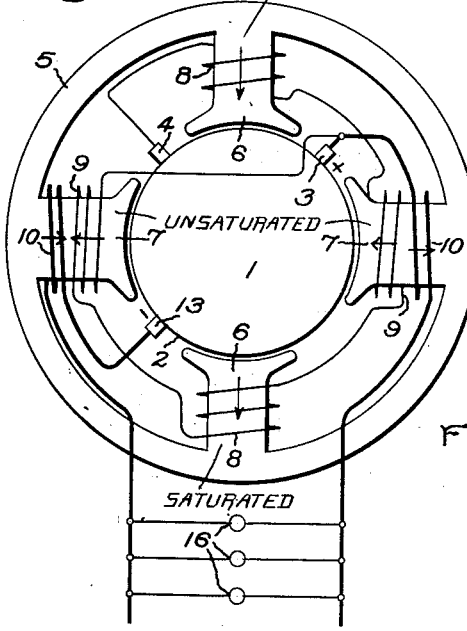

Referring to Fig. 1 of the drawing, 1 is the armature of my dynamo electric machine having a commutator 2 on which bear load brushes, or sets of brushes, 3 and 13, and an auxiliary brush, or set of brushes, 4. A field magnet structure 5 having two sets of field poles 6 and 7 surrounds the armature. The field poles 6 are arranged to produce a voltage between the third or auxiliary brush 4 and the load brush 3, and the field poles 7 are arranged to produce a voltage between the auxiliary brush 4 and the load brush 13, the voltages between brushes 4 and 3, and between brushes 4 and 13 varying at different rates with the speed of the armature. Preferably the voltage between brushes 4 and 3 varies substantially with the speed of the armature, and the voltage between brushes 4 and 13 varies approximately with the square of the speed of the armature. The voltage between the load brushes is equal to the voltage between brushes 4 and 3 minus the voltage between brushes 4 and 13. In the arrangement of this figure, in order that the voltage produced in that part of the armature connected between brushes 4 and 3 by the poles 6 will vary substantially with the speed of the armature, these poles 6 are arranged to be operated at or near magnetic saturation. In order that the voltage produced in that part of the armature connected between brushes 4 and 13 by the poles 7 will vary approximately with the square of the speed of the armature, these poles 7 are arranged to be operated substantially unsaturated, by which is meant, the magnetic ciruit of these field poles only approaches saturation when the machine operates at high speed. The field poles 6 and 7 are excited by field windings 8 and 9 respectively, which are connected between the auxiliary brush 4 and the load brush 3. Field windings 10, connected in series with the load brushes, are preferably provided. These windings 10 oppose the armature reaction and by varying the number of turns thereof, the voltage characteristics of the machine may be changed as hereinafter described. These field windings 10 are shown as being located on the unsaturated field poles 7. Arrows on the drawing indicate the direction of the flux produced by the various field windings. The armature 1 is preferably series wound and has one half as many poles as the field structure, that is, the number of poles in the armature corresponds to the number of poles in each set of the field poles. The load brushes 3 and 13 are placed 180 electrical degrees apart and the auxiliary brush 4 is located between the load brushes. The machine supplies current to translating devices, such as lights 16, connected across mains which are connected to the load brushes.

The operation of the dynamo electric machine of Fig. 1 is as follows: The field poles 6 and 7 are so wound that the voltage induced in the armature between the load brushes 3 and 13 is the difference between the voltage induced in that portion of the armature between main brush 3 and auxiliary brush 4 and the voltage induced between auxiliary brush 4 and the main brush 13. Since the field magnet circuit comprising the poles 6 is saturated, the voltage induced in the armature by these poles, that is, that portion of the armature connected between auxiliary brush 4 and load brush 3, is not substantially affected by any increase in the excitation of these poles, but only by the speed of the armature 1. Therefore the voltage generated between the brushes 4 and 3 is substantially directly proportioned to the armature speed. Since the field windings 8 and 9 are connected between these same brushes, the excitation of all the poles varies substantially directly with the speed of the armature 1, but as pointed out above, this has substantially no effect on the flux produced by the poles 6. Since, however, the portion of field magnet circuit, which includes the field poles 7, is unsaturated, the voltage induced in the armature between auxiliary brush 4 and main brush 13 increases approximately with the square of the speed. If the saturation of these two circuits is properly chosen, the difference between the voltages induced in these two parts of the armature, or in other words the voltage induced in the armature between the load brushes, may be made constant over a wide range of speed. It is advantageous to have the magnetic circuit of the field poles 7 approach saturation when the machine operates at high speed, particularly if the speed range is large, because otherwise the voltage will tend to decrease as the speed approaches the higher limit.

Since in the arrangement here disclosed the load current is taken from the main brushes 3 and 13, there exists an armature reaction which is substantially in line with these brushes. This armature reaction affects the regulation of my machine, particularly when the machine is operating under load, and in order to overcome this armature reaction, I provide the compensating windings 10 on the unsaturated field poles 7. It is possible by varying the strength of these compensating windings to make the voltage of the machine rise or fall, as the load on the machine increases.

Fig. 3 shows saturation curves of the magnetic circuits of the sets of poles of a machine constructed in accordance with my invention as shown and described in connection with Fig. 1. These curves are of a machine designed to generate 115 volts across the load brushes from 700 R. P. M. to 1400 R. P. M. and to deliver 9 kilowatts. Curve A is the saturation curve of the saturated poles 6 and curve B is the saturation curve of the unsaturated poles 7. These curves are plotted with "mego lines" as ordinates and "R. P. M." as abscissæ. Fig. 4 shows voltage curves of the same machine. Curve C is the voltage generated under the poles 6 between brushes 4 and 3, curve D is the voltage generated under the unsaturated poles 7 between brushes 4 and 13 and curve E is the resultant machine voltage between the load brushes 3 and 13. These curves are plotted with volts as ordinates and speed as abscissæ. It will be noted from curve E that the voltage is substantially constant from 600 R. P. M. to 1500 R. P. M.

The modification of my machine shown in Fig. 2 differs from the machine of Fig. 1 in that the poles 6' which are arranged to produce a voltage varying substantially with the speed of the armature are provided with field windings 8' supplied with constant excitation from the constant potential mains 11, and therefore operate in the same way as poles 6 in Fig. 1. Since these poles, however, are substantially unsaturated, they will be affected by the armature reaction, which in turn would affect the regulation of the machine. To prevent this, I provide the poles 6' with windings 12 connected in series with the compensating windings 10 and the armature 1, to compensate for the armature reaction. I have also shown this machine as being provided with commutating poles 14 provided with windings 15 connected in series with the armature for improving the commutation of my machine. If the load supplied by the machine of Fig. 2 includes a storage battery, the field windings 8' may be supplied with constant excitation from the mains to which the storage battery is connected.

While my invention has been particularly described in connection with constant potential variable speed operation, it is apparent that many features which characterize the construction and operation of my invention are useful in other relations and I desire to cover all such modifications and variations as fall within the scope of my invention which is set forth in the appended claims.

What I claim as new and desire to secure by Letters Patent of the United States, is:—

1. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the difference between said voltages.

2. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the difference between said voltages, and field windings connected in series with said armature.

3. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the difference between said voltages, field windings for said last mentioned set of field poles connected between said auxiliary brush and one of said load brushes, and other field windings connected in series with said armature.

4. In a variable speed dynamo electric machine, an armature provided with a commutator, load brushes and an auxiliary brush bearing on said commutator, a field magnet structure having two sets of field poles, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the difference between said voltages, and field windings for said last mentioned set of field poles connected between said auxiliary brush and one of said load brushes.

5. In a variable speed dynamo electric machine, an armature provided with a commutator, load brushes and an auxiliary brush bearing on said commutator, a field magnet structure having two sets of field poles, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, field windings for said last mentioned set of field poles connected between said auxiliary brush and one of said load brushes, and other field windings connected in series with said armature.

6. In a variable speed dynamo electric machine, an armature provided with a commutator, load brushes and an auxiliary brush bearing on said commutator, a field magnet structure having two sets of field poles, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, and field windings for all of said poles connected between said auxiliary brush and one of said load brushes.

7. In a variable speed dynamo electric machine, an armature provided with a commutator, load brushes and an auxiliary brush bearing on said commutator, a field magnet structure having two sets of field poles, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, field windings for all of said poles connected between said auxiliary brush and one of said load brushes, and other field windings on said substantially unsaturated poles connected in series with said armature.

8. In a variable speed dynamo electric machine, an armature provided with a commutator, load brushes and an auxiliary brush bearing on said commutator, a field magnet structure having two sets of field poles, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, and field windings for all of said poles connected between said auxiliary brush and one of said load brushes and across that portion of the armature which has a voltage induced therein by the saturated poles.

9. In a variable speed dynamo electric machine, an armature provided with a commutator, load brushes, and an auxiliary brush bearing on said commutator, a field magnet structure having two sets of field poles, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, field windings for all of said poles connected between said auxiliary brush and one of said load brushes and across that portion of the armature which has a voltage induced therein by the saturated poles, and other field windings on said substantially unsaturated poles connected in series with said armature.

10. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, and field windings for all of said poles connected between said auxiliary brush and one of said load brushes and across that portion of the armature which has a voltage induced therein by the saturated poles.

11. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of poles being saturated so as to produce a voltage varying substantially with the speed of said armature between said auxiliary brush and one of said load brushes, the other of said sets of poles being substantially unsaturated so as to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, field windings for all of said poles connected between said auxiliary brush and one of said load brushes and across that portion of the armature which has a voltage induced therein by the saturated pole, and other field windings on said substantially unsaturated poles connected in series with said armature.

12. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, and field windings for said last mentioned set of field poles connected between said auxiliary brush and one of said load brushes and across that portion of the armature which has a voltage induced therein by the first mentioned set of field poles.

13. In a variable speed dynamo electric machine, a series armature provided with a commutator, load brushes bearing on said commutator and located 180 electrical degrees apart, an auxiliary brush bearing on said commutator and located between said load brushes, a field magnet structure having two sets of field poles, each of said sets having the same number of poles as said armature, one of said sets of field poles being arranged so as to produce a voltage varying substantially with the speed of said armature between said auxiliary brush and one of said load brushes, and the other of said sets of poles being arranged to produce a voltage varying approximately with the square of the speed of said armature between said auxiliary brush and the other of said load brushes, the voltage between the load brushes being equal to the voltage between the auxiliary brush and one load brush which varies with the speed of the armature minus the voltage between the auxiliary brush and the other load brush which varies with the square of the speed of the armature, field windings for said last mentioned set of field poles connected between said auxiliary brush and one of said load brushes and across that portion of the armature which has a voltage induced therein by the first mentioned set of field poles, and other field windings connected in series with said armature.

14. In a dynamo electric machine, an armature provided with a commutator, load brushes and an auxiliary brush bearing on said commutator, a field magnet structure having two sets of field poles, one of said sets of poles being saturated and arranged to induce a voltage between said auxiliary brush and one of said load brushes, the other set of poles being unsaturated so that the flux therein is varied in accordance with variations in the excitation thereof, and field windings on said unsaturated field poles connected between said auxiliary brush and one of said load brushes.

15. In a dynamo electric machine, an armature provided with a commutator, load brushes and an auxiliary brush bearing on said commutator, a field magnet structure having two sets of field poles, one of said sets of poles being saturated so that the flux in said set is unaffected by armature reaction and induces a voltage between said auxiliary brush and one of said load brushes, the other set of poles being unsaturated so that the flux therein is varied in accordance with variations in the excitation thereof, field windings on said unsaturated field poles connected between said auxiliary brush and one of said load brushes, said unsaturated poles being arranged so that the flux therein tends to vary with variations in cross magnetization due to load current and means whereby the value of the cross magnetization may be controlled to vary the voltage characteristic of the machine.

16. An electrical system comprising an inherently regulated self excited dynamo electric machine having an $n$ pole armature winding and a field structure comprising $2n$ mechanical field poles arranged in two sets with an equal number of poles in each set, adjacent poles of separate sets being arranged to be of like polarity, at least three brushes coöperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for the set of poles last mentioned connected to two of said brushes, said exciting winding constituting the sole shunt excitation for said set of poles, and a load circuit connected across one pair of said brushes, the other set of poles being arranged to have the amount of flux therein controlled by the cross magnetization due to load current.

17. An inherently regulated dynamo electric machine having an $n$ pole armature winding and a field structure comprising $2n$ mechanical field poles arranged in two sets with an equal number of poles in each set, adjacent poles of separate sets being arranged to be of like polarity, at least three brushes coöperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding arranged to produce a substantially constant flux in the set of poles last mentioned, and a shunt winding coöperating with the other set of poles and connected to produce a flux varying substantially in accordance with said voltage between the third brush and one of said 180 degree brushes.

18. An inherently regulated dynamo electric machine having an $n$ pole armature winding and a field structure comprising $2n$ mechanical field poles arranged in two sets with an equal number of poles in each set, adjacent poles of separate sets being arranged to be of like polarity, at least three brushes coöperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding arranged to saturate the set of poles last mentioned and a winding connected to produce a magnetomotive-force in the other set of poles in accordance with the voltage induced in the armature winding by said saturated poles.

19. A dynamo electric machine having an $n$ pole armature winding and a field structure comprising $2n$ mechanical field poles arranged in two sets with an equal number of poles in each set, adjacent poles of separate sets being arranged to be of like polarity, at least three brushes coöperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, and windings for exciting both of said sets of poles said windings being connected so that the current therein tends to vary in accordance with said voltage between the third brush and 180 degree brush.

In witness whereof I have hereunto set my hand this 31st day of July, 1916.

SVEN R. BERGMAN.